United States Patent
Kabra et al.

(10) Patent No.: US 11,334,347 B2
(45) Date of Patent: May 17, 2022

(54) COGNITIVE BUILD RECOVERY FROM INTER-CODE COMMIT ISSUES

(71) Applicant: INTERNATIONAL BUSINESS MACHINES CORPORATION, Armonk, NY (US)

(72) Inventors: Namit Kabra, Hyderabad (IN); Vijay Ekambaram, Chennai (IN); Tarun Tater, Bangalore (IN); Saranga Dhar Tripathy, Hyderabad (IN)

(73) Assignee: International Business Machines Corporation, Armonk, NY (US)

(*) Notice: Subject to any disclaimer, the term of this patent is extended or adjusted under 35 U.S.C. 154(b) by 38 days.

(21) Appl. No.: 15/929,451

(22) Filed: May 4, 2020

(65) Prior Publication Data

US 2021/0342143 A1    Nov. 4, 2021

(51) Int. Cl.
*G06F 8/71* (2018.01)
*G06F 16/901* (2019.01)
(Continued)

(52) U.S. Cl.
CPC ............... *G06F 8/71* (2013.01); *G06F 8/65* (2013.01); *G06F 11/36* (2013.01);
(Continued)

(58) Field of Classification Search
CPC .......... G06F 8/40–52; G06F 8/70; G06F 8/71; G06F 11/3664–3672; G06F 11/368;
(Continued)

(56) References Cited

U.S. PATENT DOCUMENTS 6,876,314 B1    4/2005  Lin
7,143,394 B1 *  11/2006 Shadmon ............ G06F 11/3612
                                                    717/130
(Continued)

FOREIGN PATENT DOCUMENTS

WO      1997015890 A1    5/1997

OTHER PUBLICATIONS

Liu, Z., et al., Automatic Generation of Pull Request Descriptions, 34th IEEE/ACM International Conference on Automated Software Engineering (ASE), Nov. 11-15, 2019, pp. 176-188, [retrieved on Aug. 3, 2021], Retrieved from the Internet: <URL:http://ieeexplore.ieee.org/>.*

(Continued)

*Primary Examiner* — Geoffrey R St Leger
(74) *Attorney, Agent, or Firm* — Patterson + Sheridan, LLP

(57) ABSTRACT

Techniques for build recovery from inter-code commit failure. A build error for a software project is identified. A first software module, with one or more errors related to the build error, is selected. A comparison software module for the first software module is identified. The comparison software module includes at least one of: (i) a sibling software module to the first software module or (ii) an earlier version of the first software module. A potential problem with the first software module, related to the build error, is determined based on comparing the first software module with the comparison software module. A solution to the potential problem is generated based on the first software module. The solution includes a modification to the software code of the first software module. The solution is applied by modifying the software code of the first software module.

16 Claims, 10 Drawing Sheets

(51) Int. Cl.
*G06N 20/00* (2019.01)
*G06N 3/04* (2006.01)
*G06F 8/65* (2018.01)
*G06F 11/36* (2006.01)
*G06F 8/41* (2018.01)

(52) U.S. Cl.
CPC ....... *G06F 16/9024* (2019.01); *G06N 3/0454* (2013.01); *G06N 20/00* (2019.01); *G06F 8/41* (2013.01)

(58) Field of Classification Search
CPC ............. G06F 11/3688; G06F 11/3692; G06F 21/57–577; G06N 20/00; G06N 3/0454
USPC .................................. 717/120, 122, 124–161
See application file for complete search history.

(56) References Cited

U.S. PATENT DOCUMENTS

| | | | | |
|---|---|---|---|---|
| 7,840,944 | B2* | 11/2010 | Brunswig | G06F 11/3688 717/124 |
| 8,499,280 | B2* | 7/2013 | Davies | G06F 8/71 717/110 |
| 8,914,771 | B2* | 12/2014 | Kohli | G06F 8/75 717/108 |
| 8,943,600 | B2* | 1/2015 | Tripp | G06F 21/51 726/25 |
| 9,378,014 | B2* | 6/2016 | Wilson | G06F 8/36 |
| 9,588,876 | B2* | 3/2017 | Swierc | G06F 11/3668 |
| 10,467,132 | B1 | 11/2019 | Chatterjee et al. | |
| 2007/0006041 | A1* | 1/2007 | Brunswig | G06F 11/3688 714/38.14 |
| 2012/0167040 | A1* | 6/2012 | Davies | G06F 8/71 717/110 |
| 2013/0042222 | A1 | 2/2013 | Maddela | |
| 2014/0325477 | A1* | 10/2014 | Hawes | G06F 8/74 717/120 |
| 2015/0033202 | A1* | 1/2015 | Wilson | G06F 8/43 717/106 |
| 2016/0034270 | A1* | 2/2016 | Swierc | G06F 11/3668 717/126 |
| 2017/0351599 | A1 | 12/2017 | Elimeleh et al. | |
| 2018/0129483 | A1 | 5/2018 | Biddle et al. | |
| 2018/0157842 | A1* | 6/2018 | Holz | G06F 21/577 |
| 2019/0179689 | A1 | 6/2019 | Karanan et al. | |
| 2020/0410390 | A1* | 12/2020 | Fu | G06F 11/3466 |
| 2021/0132915 | A1* | 5/2021 | Ivankovic | G06F 8/34 |

OTHER PUBLICATIONS

Mesbah, Ali, et al., Analyzing and Repairing Compilation Errors, ICSE '19: Proceedings of the 41st International Conference on Software Engineering: Companion Proceedings, May 2019, pp. 294-295, [retrieved on Mar. 1, 2022], Retrieved from the Internet: <URL:http://dl.acm.org/>.*

Mesbah, Ali, et al., DeepDelta: Learning to Repair Compilation Errors, Proc. of the 2019 27th ACM Joint Meeting on European Software Engineering Conference and Symposium on the Foundations of Software Engineering, Aug. 2019, pp. 925-936, [retrieved on Mar. 1, 2022], Retrieved from the Internet: <URL:http://dl.acm.org/>.*

Gupta, M., Mandal, A., Dasgupta, G., & Serebrenik, A. (2018). Runtime monitoring in continuous deployment by differencing execution behavior model. In Q. Yu, C. Pahl, M. Vukovic, & J. Yin (Eds ), Service-Oriented Computing—16th International Conference, ICSOC 2018, Proceedings (pp. 812-827). (Lecture Notes in Computer Science; vol. 11236). Cham: Springer, https://doi.org/10.1007/978-3-030-03596-9_58.

* cited by examiner

US 11,334,347 B2

COGNITIVE BUILD RECOVERY FROM INTER-CODE COMMIT ISSUES

BACKGROUND

The present invention relates to compiling software code, and more specifically, to techniques for build recovery from inter-code commit failure.

SUMMARY

Embodiments include a method. The method includes identifying a build error for a software project including a plurality of software modules, and in response selecting a first software module, of the plurality of software modules, with one or more errors related to the build error, identifying a comparison software module for the first software module, the comparison software module including at least one of: (i) a sibling software module to the first software module or (ii) an earlier version of the first software module, determining a potential problem with the first software module, related to the build error, based on comparing the first software module with the comparison software module, generating a solution to the potential problem based on the first software module, the solution including a modification to the software code of the first software module, and applying the solution by modifying the software code of the first software module.

Embodiments further include a system. The system includes a processor, and a memory storing a program, which, when executed on the processor, performs an operation. The operation includes identifying a build error for a software project including a plurality of software modules, and in response selecting a first software module, of the plurality of software modules, with one or more errors related to the build error, identifying a comparison software module for the first software module, the comparison software module including at least one of: (i) a sibling software module to the first software module or (ii) an earlier version of the first software module, determining a potential problem with the first software module, related to the build error, based on comparing the first software module with the comparison software module, generating a solution to the potential problem based on the first software module, the solution including a modification to the software code of the first software module, and applying the solution by modifying the software code of the first software module.

Embodiments further include a non-transitory computer program product, the computer program product including a computer-readable storage medium having computer-readable program code embodied therewith, the computer-readable program code executable by one or more computer processors to perform an operation. The operation includes identifying a build error for a software project including a plurality of software modules, and in response selecting a first software module, of the plurality of software modules, with one or more errors related to the build error, identifying a comparison software module for the first software module, the comparison software module including at least one of: (i) a sibling software module to the first software module or (ii) an earlier version of the first software module, determining a potential problem with the first software module, related to the build error, based on comparing the first software module with the comparison software module, generating a solution to the potential problem based on the first software module, the solution including a modification to the software code of the first software module, and applying the solution by modifying the software code of the first software module.

DETAILED DESCRIPTION

Modern software projects are typically made up of a large number of different modules. These modules can be written and maintained by different engineers, or teams of engineers, but are built together to facilitate a larger project. Software code for the various modules is committed by the respective team to a repository (e.g., a version control system) after it is written. Often, software for a given module must satisfy a series of unit tests before it can be successfully committed to the repository. This helps with quality assurance and to limit software bugs introduced by new or updated code.

In some circumstances, however, updated software code for a given module may satisfy the unit tests for that module, but may cause a build of the complete project (e.g., including additional modules) to fail. This can be because, for example, other modules depend on particular outputs or actions by the modified module, and changes in the newly committed module cause errors when combined into the larger project.

This can be particularly costly in large projects, where a build can take many hours and is often left to complete without supervision (e.g., overnight). For example, a team for a given project may undertake nightly builds of the complete system. System administrators and engineers may not supervise the entire build process, instead scheduling the build to begin after the close of business for the day and reviewing the results in the morning. A build failure in this scenario is a significant burden, because it cannot be remedied until much later and intervening time (e.g., overnight) is lost.

It can be very challenging to identify and remedy the causes of the build failure. In some existing systems, like contract testing, design documentation can be used to assist in identifying and remedying errors. But design documentation is often not up to date and may not even be completed until after the software code is completed. This makes techniques that rely on design documentation undesirable.

One or more embodiments disclosed herein relate to automated detection of problems, and automated generation of solutions to those problems, for inter-code commit failures. A build failure can be detected automatically, and a number of potential causes can be identified and ranked based on likelihood of being the cause of the build failure. Solutions for these problems can also be identified (e.g., using cognitive machine learning techniques), and automatically applied. This allows for automatic remedies for a build failure, allowing the build to complete without user intervention. The applied solutions can then be provided to the supervising administrator or engineer(s), who can elect whether to keep the applied solutions or apply a different solution. In either event, a working build is created automatically, potentially saving significant time and resources.

Figure 1:
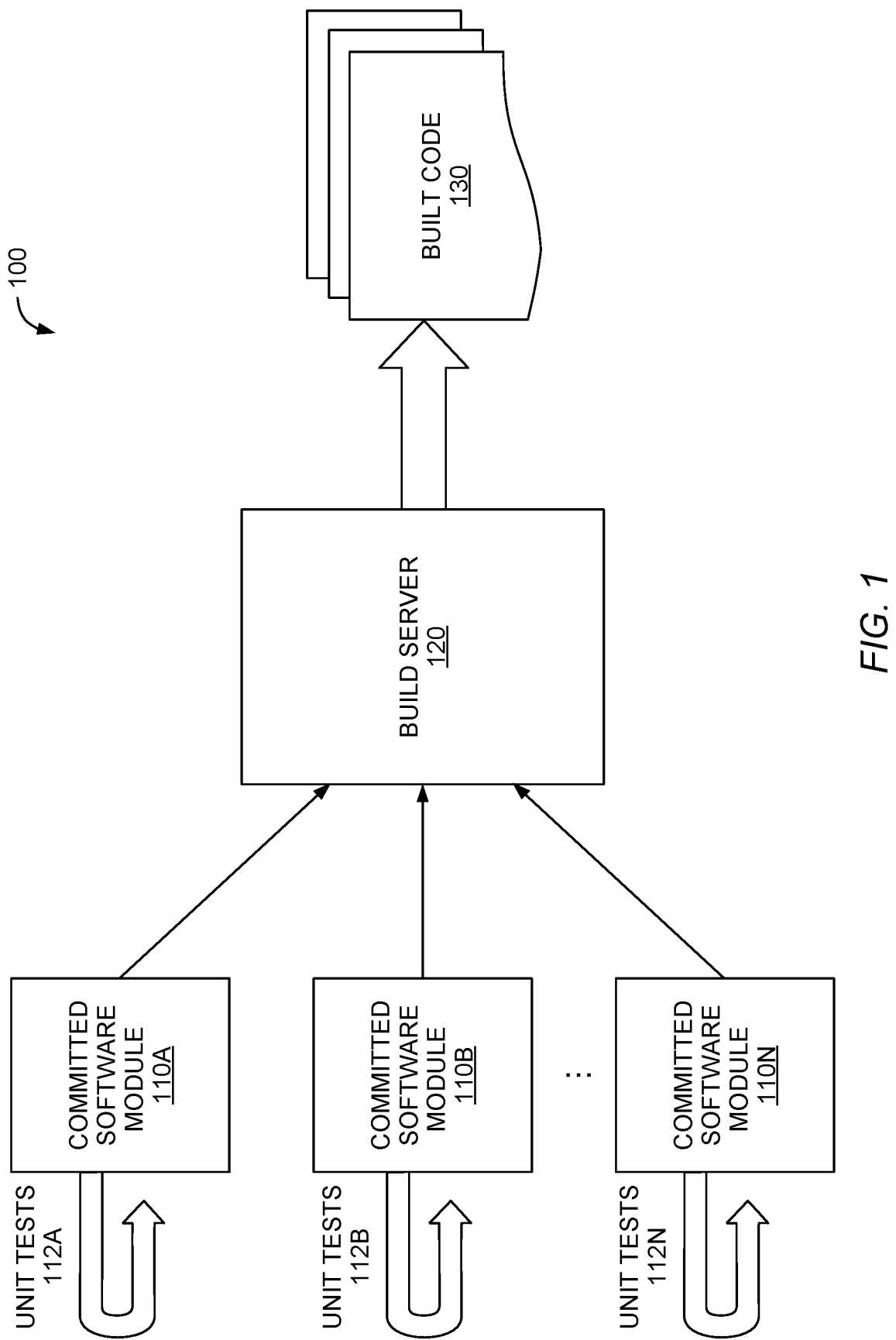
FIG. 1 illustrates a system for building a software project from a number of modules of committed source code, according to at least one embodiment.

FIG. 1 illustrates a system 100 for building a software project from a number of modules of committed source code, according to at least one embodiment. The system 100 includes a number of committed software modules 110A-N. Each committed software module 110A-N represents a module in a software project committed to a repository (e.g., a version control system).

Each committed software module 110A-N can further relate to a respective one or more unit tests 112A-N. For example, the committed software module 110A is associated with the unit tests 112A. In an embodiment the unit tests 112A operate to test the operation of the software code in the committed software module 110A. For example, the software code may be required to pass the unit tests 112A prior to being committed to the repository. Alternatively, the unit tests 112A can run on the software code after it has committed. Further, unit tests are merely one example of suitable software tests. Any suitable quality assurance procedures or tests can be run on the software code in the committed software modules 110A-N, prior to committing the code or after committing the code.

A build server 120 uses the committed software modules 110A-N to build a software project and generate built code 130. In an embodiment, the build server 120 operates on human readable (e.g., not yet compiled) software code in the committed software modules 110A-N, compiles the modules, and generates compiled code. The built code 130 includes all of the committed software modules 110A-N. Alternatively, or in addition, one or more of the committed software modules 110A-N may be compiled prior to a build by the build server 120. In this embodiment, the build server 120 can compile any remaining modules along with the already-compiled code from the remaining modules.

In an embodiment, the committed software modules 110A-N include software code that requires compilation (e.g., C, C++, C #, Java, etc.). Alternatively, or in addition, one or more of the committed software modules 110A-N may include code written in an interpreted software language that does not require compilation (e.g., Ruby, JavaScript, Lisp, etc.). The committed software modules 110A-N can include code that is all written in the same programming language, or that is written in different languages. In an embodiment, the build server 120 is configured to compile (as necessary) the software code in each of the committed software modules 110A-N using a suitable compiler, in order to generate the built code 130.

Figure 2:
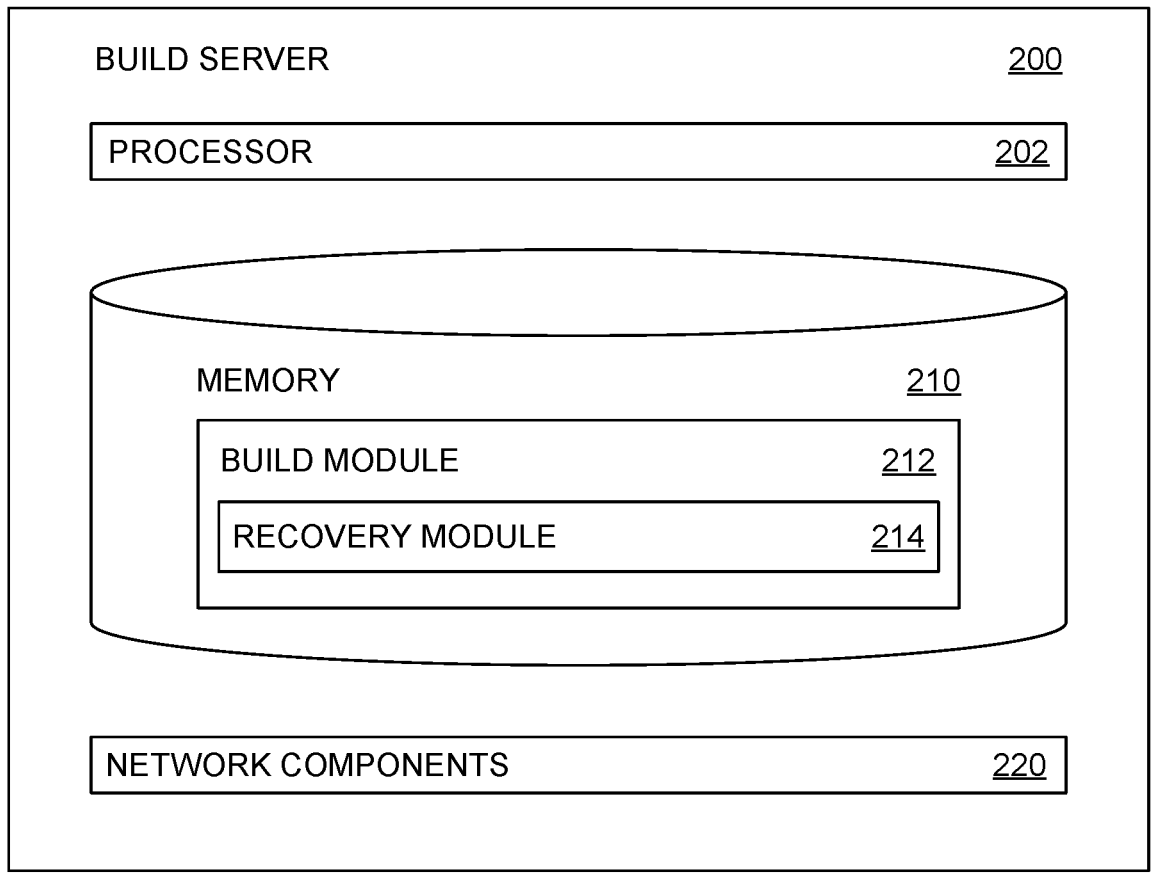
FIG. 2 is a block diagram illustrating a build server for build recovery from inter-code commit failures, according to at least one embodiment.

FIG. 2 is a block diagram illustrating a build server 200 for build recovery from inter-code commit failures, according to at least one embodiment. The build server 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the build server 200 to interface with components over a network. For example, the committed software modules 110A-N illustrated in FIG. 1 can be stored in a network accessible repository (e.g., in cloud storage or on an enterprise network). The build server 200 can access this over a local area network (LAN), for example an enterprise network, a wide area network (WAN), the Internet, or any other suitable network. The network components 220 can include wired, WiFi or cellular network interface components and associated software to facilitate communication between the build server 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the build server 200. The program code is generally described as various functional "applications" or "modules" within the memory 210, although alternate implementations may have different functions and/or combinations of functions.

Within the memory 210, a build module 212 facilitates building a software project. For example, as discussed above in relation to FIG. 1, the build module 212 can use appropriate compiler software to compile the software code in the various committed software modules 110A-N. The build module 212 can also include suitable logging software, scripts, etc.

In an embodiment, the build module 212 includes a recovery module 214. The recovery module 214 can be used to identify problems that caused a build failure, identify possible solutions to the problems, and remedy the problems. This is discussed further below with regard to subsequent figures.

Figure 3:
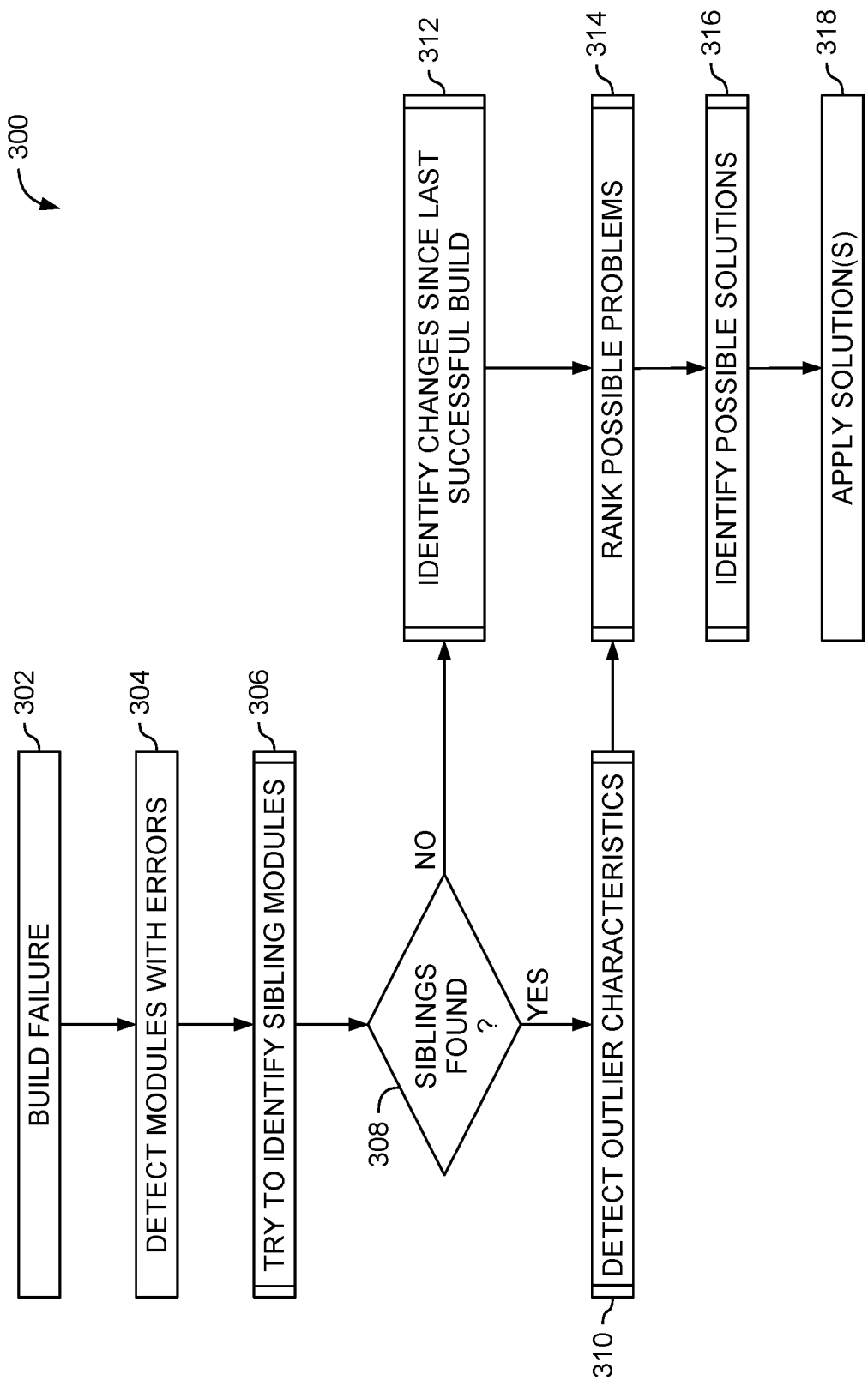
FIG. 3 is a flowchart for build recovery from inter-code commit failures, according to at least one embodiment.

FIG. 3 is a flowchart 300 for build recovery from inter-code commit failures, according to at least one embodiment. At block 302 a build module (e.g., the build module 212 illustrated in FIG. 2) determines that a build failure has occurred. For example, an error could occur in building a number of committed software modules (e.g., the committed software modules 110A-N illustrated in FIG. 1).

At block 304, a recovery module (e.g., the recovery module 214 illustrated in FIG. 2) detects modules with errors. For example, the recovery module can identify which of the committed software modules generate errors during the build. In an embodiment, the recovery module can do this by mining build logs. When a build fails, a build log can provide an error trace identifying the sequence of calls that led the failure (e.g., a trace of procedure or method calls prior to the error occurring). In an embodiment, the recovery module can extract the error trace from the bottom up to identify the module and block of code where the build failed. The recovery module can maintain a list of the modules where the build failed.

At block 306, the recovery module tries to identify sibling modules related to the module(s) where errors occurred. In an embodiment, sibling modules are inter-dependent modules, in which sibling modules each consume the output of the same parent node. This is discussed further with regard to FIG. 4, below.

At block 308, the recovery module determines whether any sibling modules were found for any of the modules in which errors occurred. If so, the flow proceeds to block 310. If not, the flow proceeds to block 312.

At block 310, the recovery module detects outlier characteristics between the sibling modules. In an embodiment, the recovery module identifies interaction patterns (e.g., patterns in the interactions between the sibling modules and their shared parent) that are different in the module with an error as opposed to its siblings. These discrepancies are likely to be the source of problems in the build. This is discussed further with regard to FIG. 5.

Returning to block 312, the recovery module identifies changes in the module(s) at which errors occur since the last successful build. In an embodiment, as discussed above, the committed software modules are stored in a repository that includes a version control system. This version control system maintains different versions of the code, over time, reflecting changes to the code. Mining through prior builds, and comparing the version of a module with an error occurring to the last version that was part of a successful build, can further identify likely problems. This is discussed further below with regard to FIG. 6.

At block 314, the recovery module ranks possible problems. In an embodiment, at block 310 and/or block 312 the recovery module identifies numerous potential problems. The recovery module can score these identified problems for their likelihood of being the source of the build failure, and can then rank the problems based on this score. This is discussed further below with regard to FIG. 7.

At block 316, the recovery module identifies possible solutions to the problems. In an embodiment, the recovery module can auto-curate possible solutions to the problems by, for example, identifying comparable working code in siblings and earlier (working) versions. This is discussed further below with regard to FIG. 8.

Further, the recovery module can use cognitive deep learning (e.g., machine learning) techniques to identify solutions. For example, the input and output of unit tests on the various committed software modules can be used as input and output for a deep learning model to identify suitable code transformations to solve the identified problems. This is discussed further with regard to FIG. 9, below.

At block 318, the recovery module applies the identified solutions. In an embodiment, the recovery module can apply the solutions one by one, in ranked order, until the build is successful. That is, in an embodiment, the recovery module modifies the relevant code to try to solve the problem (e.g., by commenting out a potentially problematic line of code, changing inputs to a procedure or method call, correcting type errors, etc.) In one embodiment, the recovery module tests the solutions by undertaking the build.

Alternatively, or in addition, the success of the possible solutions can be estimated without undertaking a complete build. For example, the recovery module can maintain a generic pool of build containers (e.g., dockers) for different versions of pre-defined frameworks. The recovery module can select an appropriate container for the identified solution (e.g., based on the framework and language used in the relevant module), or can use a container file provided in a repository (e.g., a docker file in a code repository). Dependencies for the relevant module can be gathered from various sources (e.g., a requirements.txt file, a package.json file, a maven file, etc.) and can be used for automated testing. This can allow testing of numerous possible solutions over a short period of time, without taking the time and computing resources to undertake a complete build.

Figure 4:
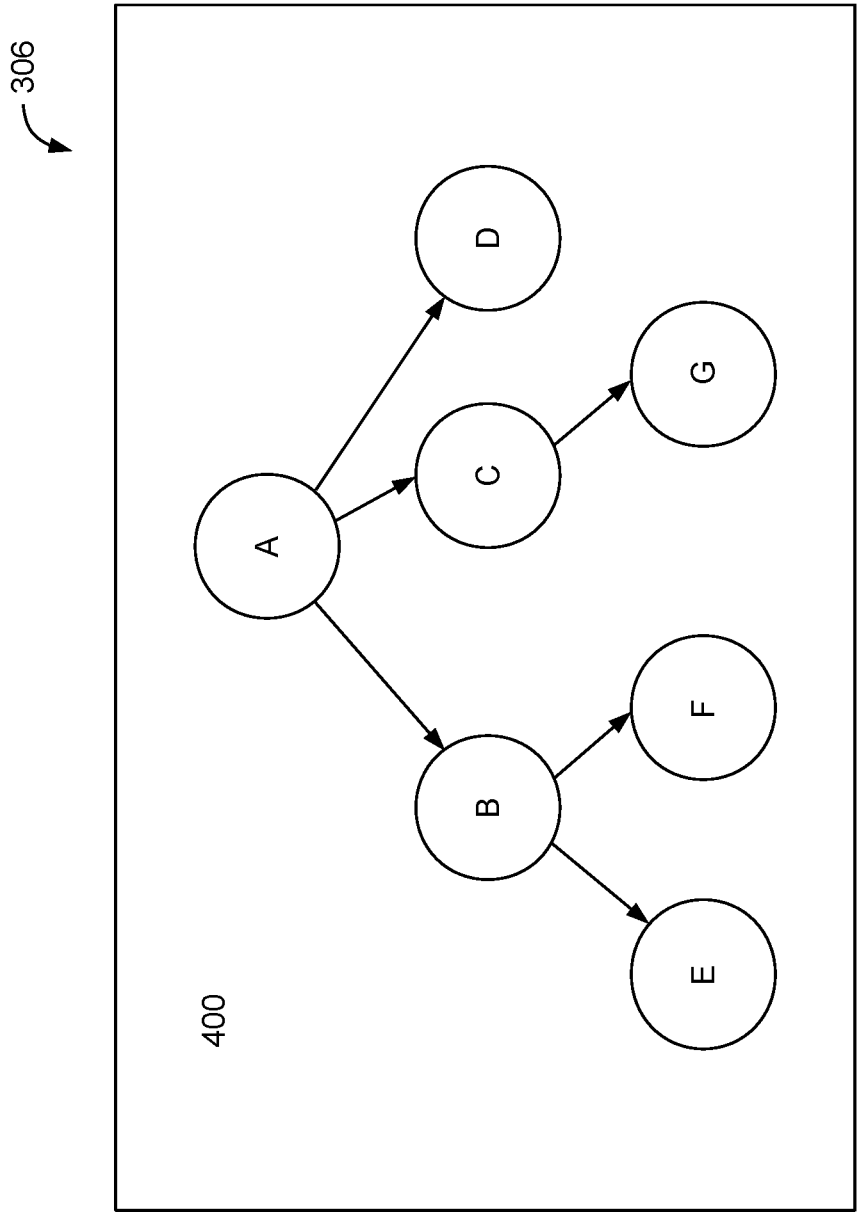
FIG. 4 illustrates identifying sibling modules for build recovery from inter-code commit failures, according to at least one embodiment.

FIG. 4 illustrates identifying sibling modules for build recovery from inter-code commit failures, according to at least one embodiment. In an embodiment, FIG. 4 relates to block 306 in FIG. 3. As discussed above, in an embodiment sibling modules are modules that are interdependent (e.g., modules that each consume the output of the same parent node). In an embodiment, code parsing techniques (e.g., as are well known to persons of ordinary skill in the art) can be used to parse the code of modules where errors occur, and build a dependency graph.

Element 400 in FIG. 4 illustrates an example dependency graph. Each of the vertices labeled A, B, C, D, E, F, and G represent software modules. The directed edges between vertices signify that the endpoint module consumes the output of the starting point module. In FIG. 4, the vertices B, C, and D each consume the output of the vertex A. The vertices E and F consume the output of the vertex B. The vertex G consumes the output of the vertex C.

In the dependency graph 400, vertices B, C, and D are siblings because each directly consumes the output of vertex A. Vertices E and F and also siblings because each consumes the output of vertex B. Vertex G does not have a sibling. Because sibling nodes consume the output of the same parent node, as discussed further below with regard to FIG. 5 they can provide a source of comparison to identify problems and solutions in the build.

Figure 5:
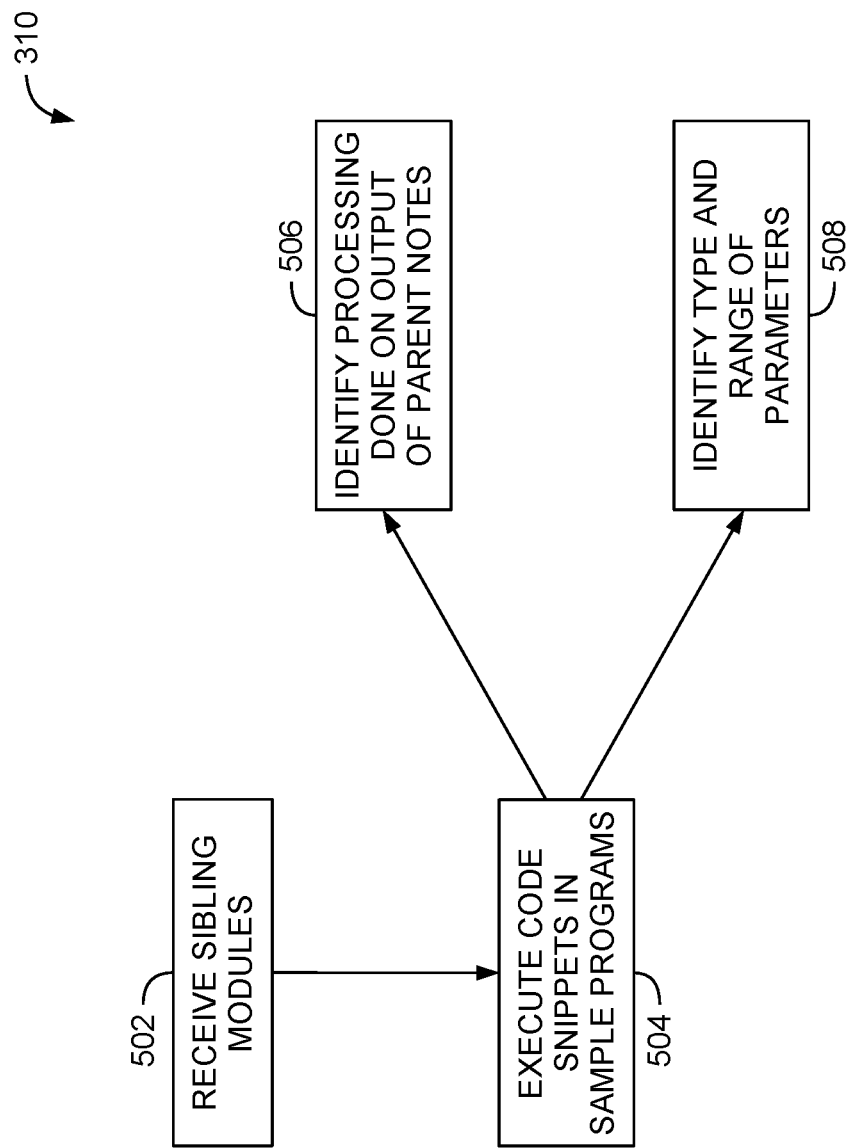
FIG. 5 is a flowchart for identifying outliers between sibling modules for build recovery from inter-code commit failures, according to at least one embodiment.

FIG. 5 is a flowchart for identifying outliers between sibling modules for build recovery from inter-code commit failures, according to at least one embodiment. In an embodiment, FIG. 5 corresponds with block 310 illustrated in FIG. 3. At block 502, a recovery module (e.g., the recovery module 214 illustrated in FIG. 2) receives sibling modules. For example, the recovery module receives all sibling modules related to a given module that was identified as having an error. In an embodiment, the flow of FIG. 5 can be undertaken for each module, identified at block 304 in FIG. 3 as having an error, which has at least one sibling.

At block 504, the recovery module executes identified code snippets in the sibling modules in sample programs. For example, the recovery module can identify code snippets surrounding error identified using the build error logs, as discussed above. In an embodiment, this is done to identify discrepancies between the sibling modules. Further, in an embodiment executing the identified code snippets in sample programs can identify outlier patterns.

For example, at block 506 the recovery module compares processing done on the output of the parent node across the sibling modules. Differences in this processing (e.g., type of output from the parent node expected, operations performed on the output from the parent node, expected content of the output from the parent node) can signify errors. As another example, at block 508 the recovery module identifies the type and range of different parameters in the sibling modules (e.g., input parameters). Executing the code snippets in sample programs, as illustrated at block 504, can allow the recovery module to make these comparisons and identify outlier patterns across the sibling modules.

Figure 6:
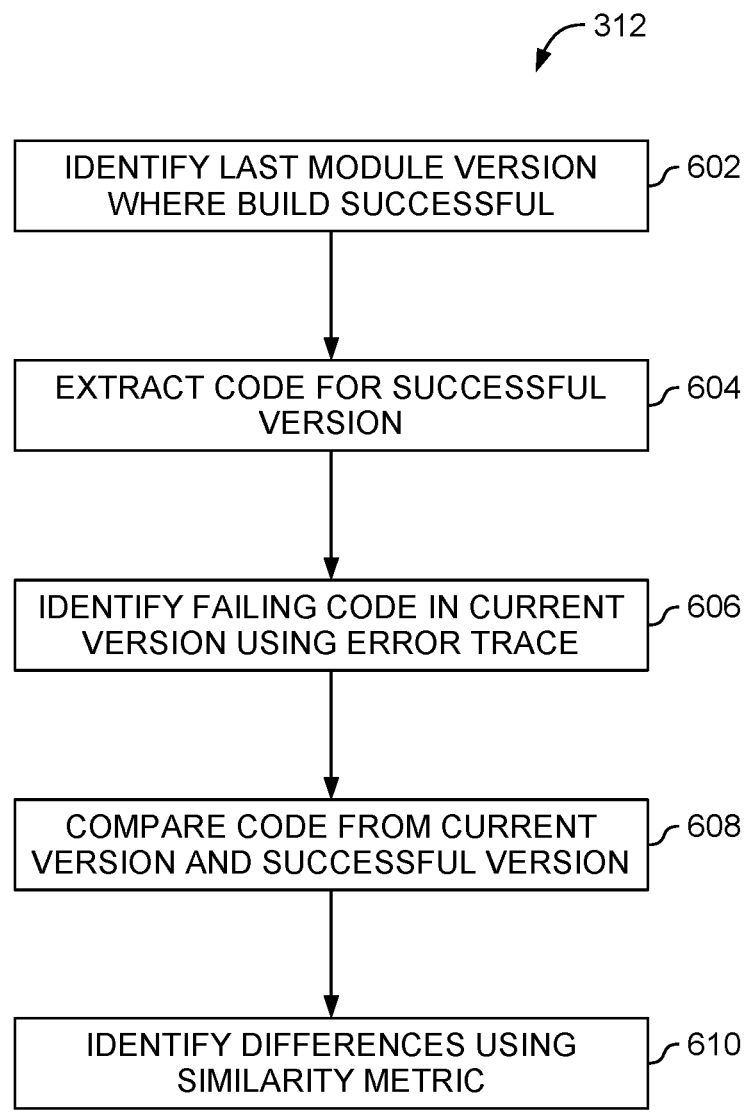
FIG. 6 is a flowchart for identifying changes in a module since a last successful build for build recovery from inter-code commit failures, according to at least one embodiment.

FIG. 6 is a flowchart for identifying changes in a module since a last successful build for build recovery from inter-code commit failures, according to at least one embodiment. In an embodiment, FIG. 6 corresponds with block 312 illustrated in FIG. 3. As discussed above, in an embodiment the flow in FIG. 6 is performed for modules in which errors occur, but which do not have siblings to allow the flow of FIG. 5 to be performed. Alternatively, or in addition, the flows of both FIG. 5 and FIG. 6 can be used to identify problems in a module where an error occurred.

At block 602, a recovery module (e.g., the recovery module 214 illustrated in FIG. 2) identifies the last version of the module where a build was successful. As discussed above, in an embodiment software code for the modules is maintained in a repository with a version control system that allows access to prior versions of each module. At block 602, the recovery module retrieves the version of the module source code that was used when the last build occurred. In an embodiment, this can be done based on a label (e.g., a build label correlating different module versions), a timestamp (e.g., the last software code version checked into the repository prior to the time of the last build), or in any other suitable manner.

At block 604, the recovery module extracts the module software code for the version where the build was successful. At block 606, the recovery module identifies the portion of the current-version module software code that is failing using an error trace (e.g., using a build error log). This is merely one example of a way to identify the failing portion of the module software code, and other suitable techniques can be used. At block 608, the recovery module compares the code from the current version of the module (where the error occurred) with the version that was used in the last successful build.

At block 610, the recovery module identifies any differences between these code sections using a similarity metric. For example, abstract syntax trees can be used to represent each of the two code sections, and the abstract syntax trees can be compared. The differences between the abstract syntax trees can represent the differences in the versions of the module. This is merely one example, and other suitable techniques can be used to identify differences between the different versions of the code sections.

Figure 7:
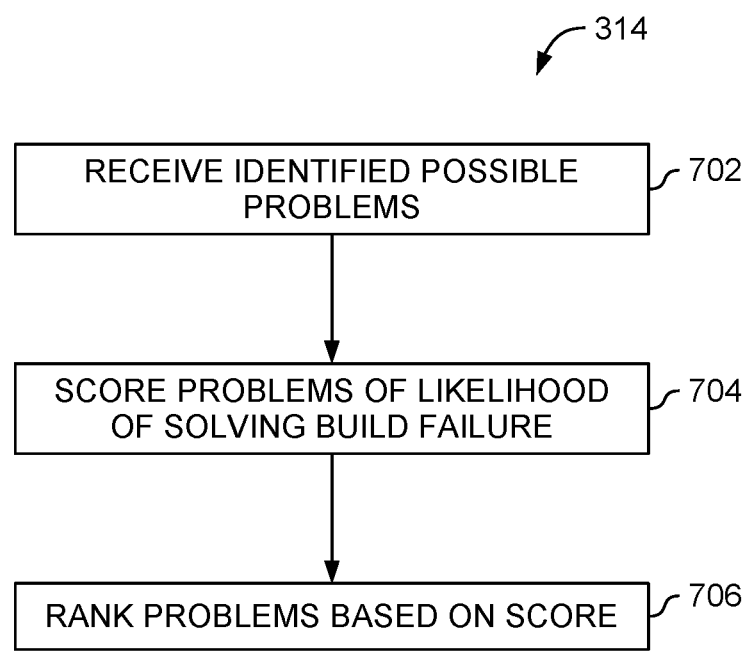
FIG. 7 is a flowchart for ranking possible problems in a build for build recovery from inter-code commit failures, according to at least one embodiment.

FIG. 7 is a flowchart for ranking possible problems in a build for build recovery from inter-code commit failures, according to at least one embodiment. In an embodiment, FIG. 7 relates to block 314 illustrated in FIG. 3. At block 702 a recovery module (e.g., the recovery module 214 illustrated in FIG. 2) receives the identified possible problems for the modules where errors occurred. As discussed above these can come from block 310, block 312, or both.

At block 704, the recovery module scores the problems for likelihood of solving the build failure. In an embodiment, this can be done using the equation below:

$$Sp = \sum_{k=0}^{n}(\alpha C_k) + \beta n_i + \gamma n_o$$

In this equation, $S_p$ represents the score for a given error. $\alpha$, $\beta$, and $\gamma$ are tunable hyper-parameters. $C_k$ represents the confidence (e.g., likelihood) from code similarity computations (e.g., across sibling modules or across versions of a module). And $n_i$ and $n_o$ correspond to the number of inflow and outflow modules, respectively, from a particular node. For example, the number of inflow modules can be the number of other modules that call the respective module and the number of outflow modules can be the number of other modules that the respective module calls. In an embodiment, this algorithm improves with time and data about what has worked for a particular system. For example, feedback about the success in identifying problems with prior builds can be used to modify the $\alpha$, $\beta$, and $\gamma$ hyperparameters. At block 706, the recovery module ranks the problems based on the score.

Figure 8:
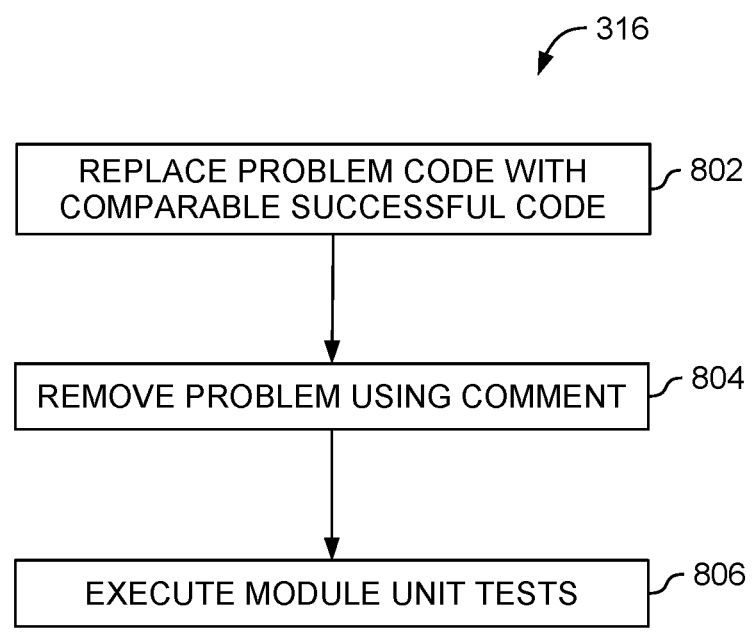
FIG. 8 is a flowchart for identifying possible solutions to problems in a build for build recovery from inter-code commit failures, according to at least one embodiment.

FIG. 8 is a flowchart for identifying possible solutions to problems in a build for build recovery from inter-code commit failures, according to at least one embodiment. In an embodiment, FIG. 8 corresponds with block 316 illustrated in FIG. 3. In an embodiment, the flow illustrated in FIG. 8 operates to identify solutions to problems in the order in which the problems were ranked by the flow illustrated in FIG. 7.

At block 802 a recovery module (e.g., the recovery module 214 illustrated in FIG. 2) replaces the identified problem code with comparable successful code. For example, as discussed above a problematic code section can be compared to a sibling software module. The identified comparable code in the sibling could be used to replace the problematic code. As another example, as discussed above a problematic code section can be compared to a prior version of the module in which the build was successful. The identified earlier code can be used to replace the problematic code.

At block 804, as an alternative to block 802 or in addition to block 802, a recovery module can remove the problematic code. This could be done by, for example, commenting out the problematic portion of the code. Blocks 802 and 804 merely illustrate examples, and other suitable techniques can be used. For example, FIG. 9 below illustrates a deep learning solution to generate successful code. In an embodiment, any modification to the code is documented for the relevant administrator or engineer (and prior versions are saved) to facilitate rollback.

At block 806, the recovery module executes the module unit tests. As discussed above in relation to FIG. 1, in an embodiment the unit tests help ensure that the relevant module itself does not include errors. If the module fails any of the unit tests after modification, the changes can be rolled back and an alternative modification can be used.

Figure 9:
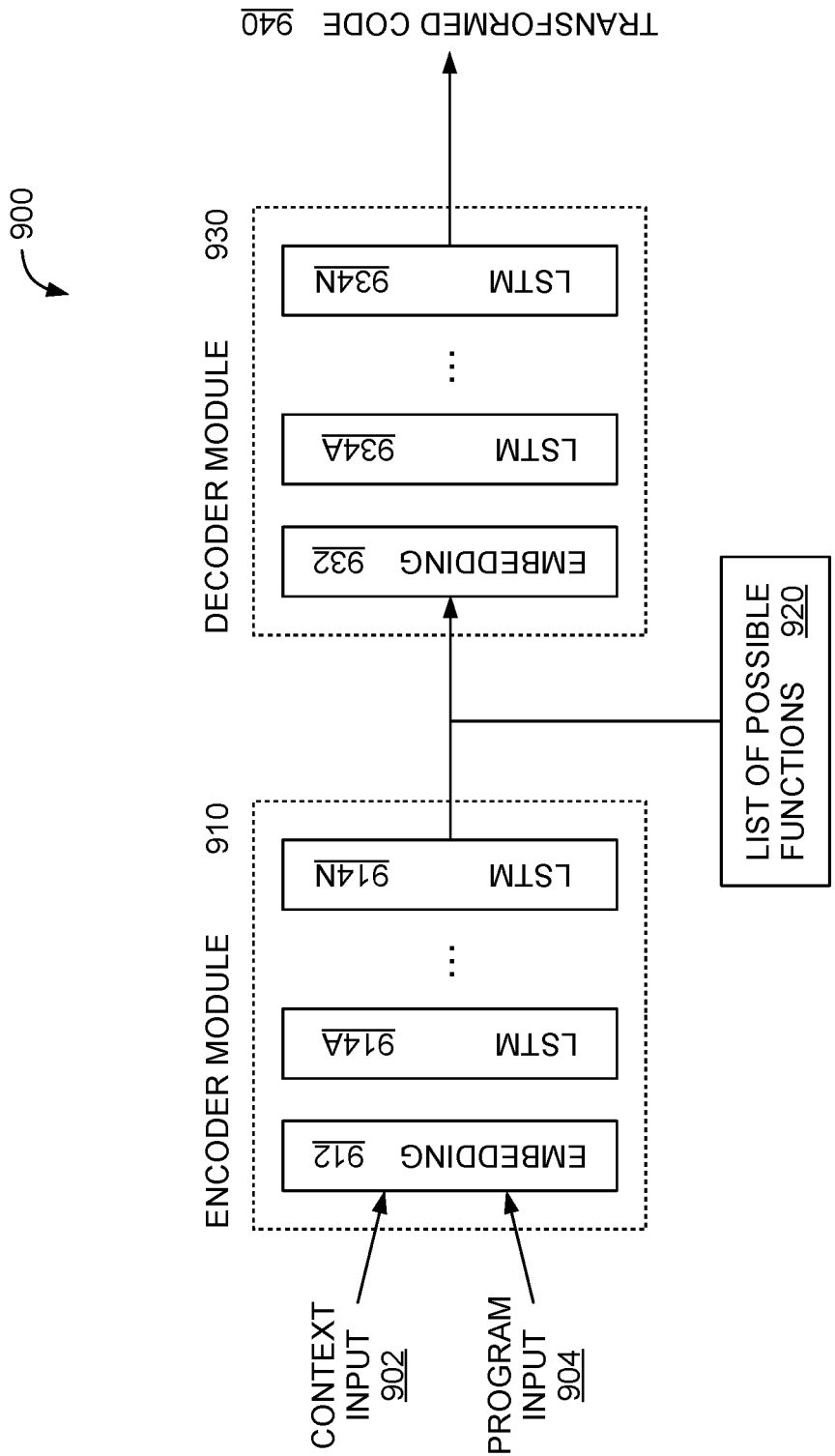
FIG. 9 illustrates cognitive techniques for identifying possible solutions to problems in a build for cognitive build recovery from inter-code commit failures, according to at least one embodiment.

FIG. 9 illustrates cognitive techniques for identifying possible solutions to problems in a build for cognitive build recovery from inter-code commit failures, according to at least one embodiment. In an embodiment, FIG. 9 illustrates an alternative (or supplemental) solution for block 316 illustrated in FIG. 3, along with the flow illustrated in FIG. 8. In an embodiment, the deep learning model 900 illustrated in FIG. 9 can output transformed code to solve identified errors.

The deep learning model 900 includes an encoder module 910 that receives a context input 902 and a program input 904. In an embodiment, the context input 902 relates to adjacent (or otherwise related) code snippets for the error code snippets that are being corrected. In an embodiment, the program input 904 refers to test case input for a given module, as well as test case inputs for the entire system. This can be used to verify that the transformed code, after a solution has been implemented, still produces the required output for the prescribed input. For example, this can be used to check the functionality of transformed code against the test cases.

The encoder module 910 includes an embedding layer 912. In an embodiment, embedding layers are used for generating an intermediate representation of input (e.g., text data). For example, embedding layers can help transform discrete inputs, such as words, into continuous vectors for the deep learning module to learn the vectors in latent space, recognize patterns in the input, and meaningfully use them for a given task. The encoder module 910 further includes one or more long short-term memory (LSTM) layers 914A-N. In many circumstances, using multiple LSTM layers in a deep learning module can help in performing complex tasks (e.g., code transformation). For example, multiple LSTM layers can help to remember more context about the data. Embedding layers and LSTM layers are commonly used in deep learning cognitive models and are well known to people of ordinary skill in the art. In an embodiment, the number of LSTM layers used can be customized.

The output of the encoder module 910 is combined with a list of possible functions 920 and provided as input to a decoder module 930. In an embodiment, the list of possible functions 920 can be a curated list based on the application being applied. For example, these can be relatively simple functions to multiply two numbers, or more complex functions to read a comma-delimited input stream, normalize data, remove error values (e.g., Not A Number values) or any other suitable functions. The decoder 930 includes an embedding layer 932 and one or more LSTM layers 934A-N. The decoder module outputs transformed code 940.

The deep learning model 900 is merely one example of a suitable cognitive model to identify possible solutions to problems in a build. Any suitable cognitive model can be used.

Figure 10:
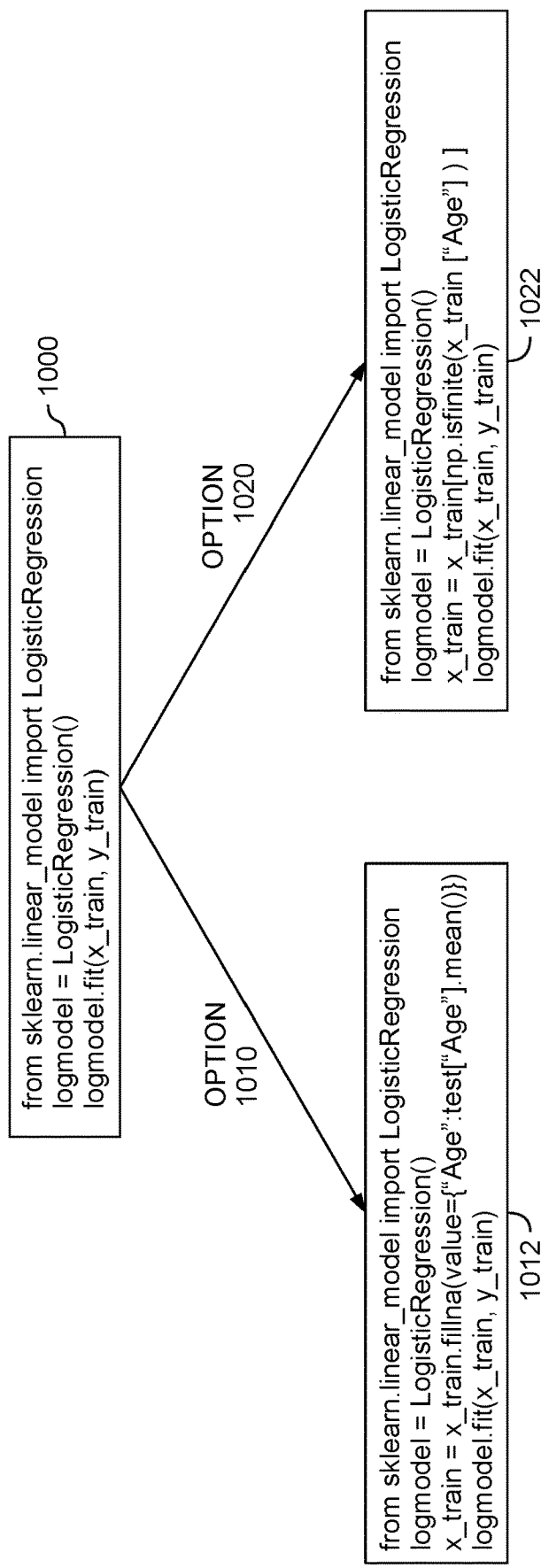
FIG. 10 illustrates an example of modified code options for build recovery from inter-code commit failures, according to at least one embodiment.

FIG. 10 illustrates an example of modified code options for build recovery from inter-code commit failures, according to at least one embodiment. In an embodiment, a module 1000 is identified as a likely problem in a build failure (e.g., as discussed above). The module 1000 takes as input a dataframe variable "X_train" and applies a machine learning model to it.

Assume the module 1000 is called by three other modules, each of which supplies the dataframe input. Two of the other modules supply a dataframe that includes all finite values, and the module 1000 builds correctly. But the third module supplies a dataframe which may have some NaN (e.g., not-a-number) values. This can cause build errors because the dataframe used as input to the module improperly includes NaN values.

In an embodiment, a recovery module (e.g., the recovery module 214 illustrated in FIG. 2) identifies the problem based on differences between the three modules that call the module 1000. The recovery module then identifies two possible solutions. In option 1010, the module 1012 fills all NaN values in the X_train dataframe with a placeholder value (e.g., a mean age value). This results in the new code: "X_train=X_train.fillna(value={'Age':test['Age'].mean ()})." In option 1020, the module 1022 modifies the X_train dataframe to remove any rows that contain a NaN value. This results in the new code: "X_train=X_train[np.isfinite (X_train ['Age'])]." Both solutions should fix the associated build error, by ensuring that the X_train dataframe variable does not include NaN values.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the build server 200) or related data available in the cloud (e.g., a public cloud, a private cloud, a hybrid cloud, etc.). For example, the build module 212 and the recovery module 214 could execute on a computing system in the cloud. In such a case, the build module 212 could build the committed software modules and store compiled code and associated logs and other data at a storage location in the cloud. As another example, the committed software modules (e.g., the committed software modules 110A-N illustrated in FIG. 1) could be stored at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
identifying a build error for a software project comprising a plurality of software modules, and in response:
selecting a first software module, of the plurality of software modules, with one or more errors related to the build error;
identifying one or more sibling software modules for the first software module based on determining that each of the one or more sibling software modules consumes an output generated by a same parent software module as the first software module;
selecting a sibling software module, of the one or more sibling software modules, as a comparison software module for the first software module;
determining a potential problem with the first software module, related to the build error, based on comparing the first software module with the comparison software module, comprising:
identifying a difference between the first software module and the sibling software module, the difference comprising at least one of: (i) a difference in processing the output of the parent software module between the first software module and the sibling software module or (ii) a difference in parameters between the first software module and the sibling software module, wherein the identifying the difference is done based on executing one or more snippets of the first software module and the sibling software module in a sample program;
generating a solution to the potential problem based on the first software module, the solution comprising a modification to the software code of the first software module; and
applying the solution by modifying the software code of the first software module.

2. The method of claim 1, further comprising:
generating a dependency graph for the plurality of software modules, wherein the identifying the one or more sibling software modules for the first software module is based on the dependency graph.

3. The method of claim 1, further comprising:
identifying a second build error for the software project comprising the plurality of software modules, and in response:
selecting a second software module, of the plurality of software modules, with one or more errors related to the second build error;
identifying an earlier version of the second software module based on identifying a most recent successful build for the software project; and
determining a second potential problem with the second software module, related to the second build error, based on comparing the second software module with the earlier version of the second software module.

4. The method of claim 3, wherein the determining the second potential problem with the second software module further comprises:
identifying a difference between the second software module and the earlier version of the second software module using a similarity metric.

5. The method of claim 4, wherein the similarity metric comprises an abstract syntax tree.

6. The method of claim 1, further comprising:
identifying a plurality of potential problems with the plurality of software modules, related to the build error, wherein the plurality of potential problems comprises the determined potential problem with the first software module; and
ranking the plurality of potential problems based on a likelihood that fixing the respective potential problem will cure the build error.

7. The method of claim 6, wherein the ranking the plurality of potential problems is based on a score for each respective potential problem, the score for each respective problem generated based, at least in part, on: (1) a first number of other modules called by a respective module, and (2) a second number of other modules that call the respective module.

8. The method of claim 1, wherein generating the solution to the potential problem comprises at least one of: (i) replacing software code in the first software module with software code from the comparison software module or (ii) removing software code from the first software module.

9. The method of claim 1, wherein the generating the solution to the potential problem comprises using a machine learning model to generate the solution based on the potential problem.

10. The method of claim 9, wherein the machine learning model receives a context input and a program input and generates transformed software code, and wherein the machine learning model comprises:
an encoder module comprising a first embedding layer and a first one or more long short-term memory (LSTM) layers; and
a decoder module comprising a second embedding layer and a second one or more LSTM layers.

11. A system, comprising:
a processor; and
a memory storing a program, which, when executed on the processor, performs an operation, the operation comprising:
identifying a build error for a software project comprising a plurality of software modules, and in response:
selecting a first software module, of the plurality of software modules, with one or more errors related to the build error;
identifying a comparison software module for the first software module;
identifying a plurality of potential problems with the plurality of software modules, related to the build error;
ranking the plurality of potential problems based on a likelihood that fixing the respective potential problem will cure the build error, wherein the ranking the plurality of potential problems is based on a score for each respective potential problem, the score for each respective problem generated based, at least in part, on: (1) a first number of other modules called by a respective module, and (2) a second number of other modules that call the respective module;
determining a potential problem with the first software module, from among the plurality of potential problems, based on comparing the first software module with the comparison software module and based on the ranking of the plurality of potential problems;
generating a solution to the potential problem based on the first software module, the solution comprising a modification to the software code of the first software module; and applying the solution by modifying the software code of the first software module.

12. The system of claim 11, the operation further comprising:

identifying one or more sibling software modules for the first software module, each of the one or more sibling software modules consuming an output of a same parent software module as the first software module, wherein the comparison software module comprises a sibling software module of the one or more sibling software modules.

13. The system of claim 11, wherein the comparison software module comprises an earlier version of the first software module, the operation further comprising:

identifying the earlier version of the first software module based on identifying a most recent successful build for the software project.

14. The system of claim 11, wherein the generating the solution to the potential problem comprises using a machine learning model to generate the solution based on the potential problem.

15. A computer program product, the computer program product comprising:

a computer-readable storage medium having computer-readable program code embodied therewith, the computer-readable program code executable by one or more computer processors to perform an operation, the operation comprising:

identifying a build error for a software project comprising a plurality of software modules, and in response:

selecting a first software module, of the plurality of software modules, with one or more errors related to the build error;

identifying one or more sibling software modules for the first software module based on determining that each of the one or more sibling software modules consumes an output generated by a same parent software module as the first software module;

selecting a sibling software module, of the one or more sibling software modules, as a comparison software module for the first software module;

determining a potential problem with the first software module, related to the build error, based on comparing the first software module with the comparison software module, comprising:

identifying a difference between the first software module and the sibling software module, the difference comprising at least one of: (i) a difference in processing the output of the parent software module between the first software module and the sibling software module or (ii) a difference in parameters between the first software module and the sibling software module, wherein the identifying the difference is done based on executing one or more snippets of the first software module and the sibling software module in a sample program;

generating a solution to the potential problem based on the first software module, the solution comprising a modification to the software code of the first software module; and applying the solution by modifying the software code of the first software module.

16. The computer program product of claim 15, wherein the generating the solution to the potential problem comprises using a machine learning model to generate the solution based on the potential problem.

* * * * *